P. NELSON.
COMBINED BREAD CABINET AND CUTTING KNIFE.
APPLICATION FILED JULY 1, 1908.
914,866.
Patented Mar. 9, 1909.
2 SHEETS—SHEET 1.
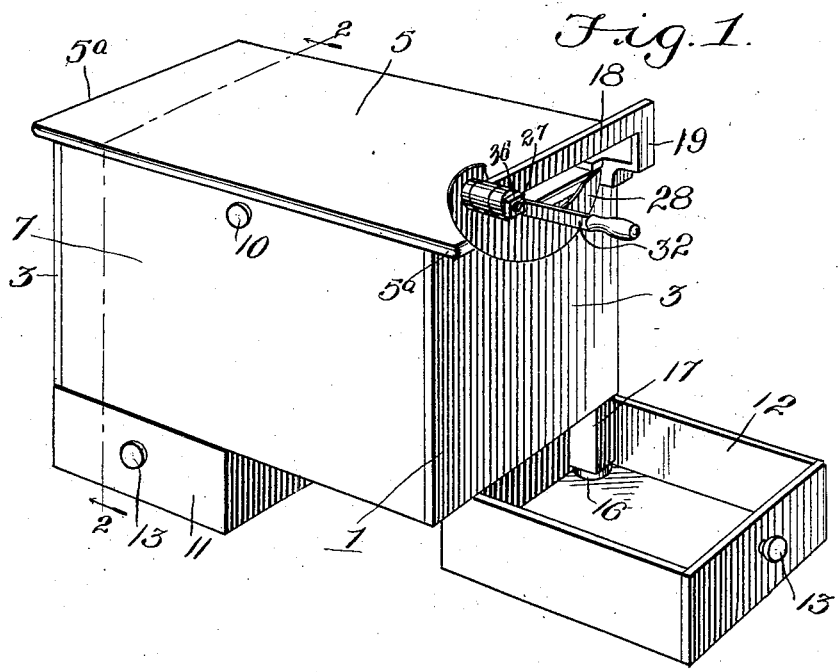
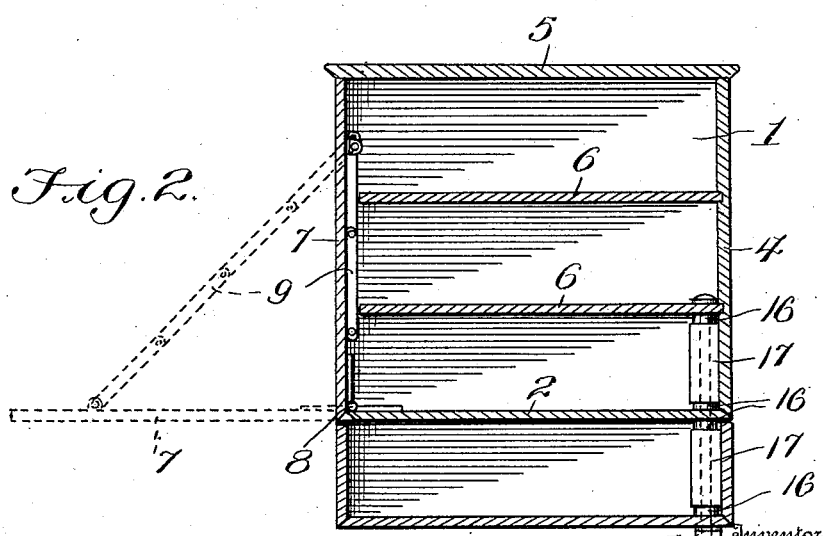
Witnesses
J. L. Wright
C. C. Hines
Inventor
Per Nelson,
By Victor J. Evans,
Attorney P. NELSON.
COMBINED BREAD CABINET AND CUTTING KNIFE.
APPLICATION FILED JULY 1, 1908.
914,866.
Patented Mar. 9, 1909.
2 SHEETS—SHEET 2.
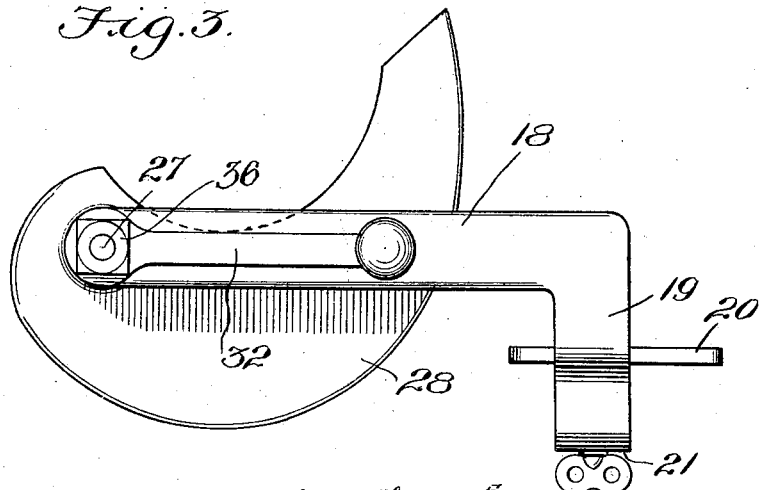
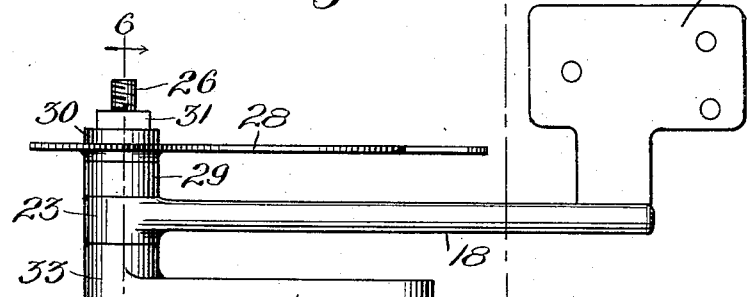
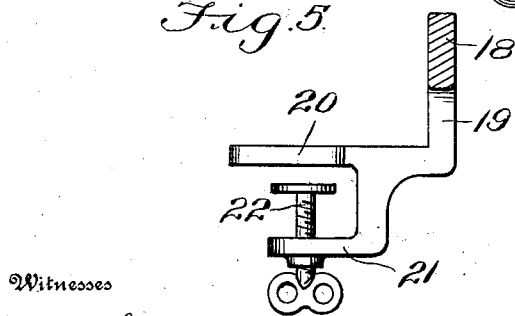
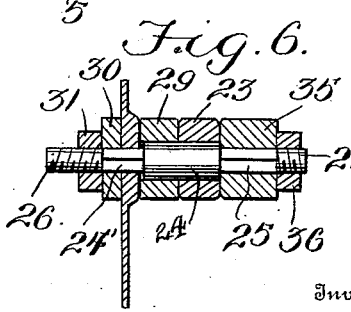
Inventor
Per Nelson,
By Victor J. Evans,
Attorney
Witnesses

UNITED STATES PATENT OFFICE.

PER NELSON, OF FORTUNA, CALIFORNIA.

COMBINED BREAD-CABINET AND CUTTING-KNIFE.

No. 914,866.  Specification of Letters Patent.  Patented March 9, 1909.

Application filed July 1, 1908. Serial No. 441,307.

*To all whom it may concern:*

Be it known that I, PER NELSON, a citizen of the United States, residing at Fortuna, in the county of Humboldt and State of California, have invented new and useful Improvements in a Combined Bread-Cabinet and Cutting-Knife, of which the following is a specification.

This invention relates to improvements in bread cabinets and cutting knives, the object in view being to provide a novel construction of cabinet having one or more pivoted drawers adapted to be swung outward to an open position, and provided with a cutting knife mounted and arranged to sever the bread supported upon the top of the cabinet into slices in such manner that the slices will fall into the drawer, in which they may be stored.

With these and other objects in view, the invention consists of the features of construction, combination and arrangement of parts hereinafter fully described and claimed, reference being had to the accompanying drawings, in which:—

Figure 1 is a perspective view of a cabinet embodying my invention with one of the swinging drawers projected for coöperation with the cutter. Fig. 2 is a vertical front to rear section through the same on line 2—2 of Fig. 1. Fig. 3 is a side elevation of the cutter. Fig. 4 is a top plan view thereof. Figs. 5 and 6 are sections on the lines 5—5 and 6—6 of Fig. 4.

Referring to the drawings, 1 designates the body or casing of the cabinet, which is preferably of oblong rectangular form and open at the front, and comprises a bottom 2, side walls 3, a back wall 4 and a top wall 5. Within the body is arranged one or more horizontal partitions or shelves 6, to support the loaves of bread, cake or other stuff stored therein. The front of the cabinet is closed by a door 7 hinged at its lower edge to the bottom wall 2, as at 8. This door is adapted to be swung outward to the horizontal dotted line position shown in Fig. 2 and to be held or suspended in such position by hangers consisting of a series of jointed members or links 9, the end links being pivotally connected with the body and door. Two of these hangers are employed, one at each side of the cabinet, the terminal links of which are respectively connected with the door adjacent its side edges and with the side walls of the cabinet. When the door is in closed position the links fold between the same and the outer edges of the shelves 6 and hold the door closed. A knob or other suitable grip 10 is provided to enable the door to be conveniently manipulated. When the door is opened by pulling outward and downward on this knob, the links unfold and straighten out and thus support the opened door in a horizontal position. The door when thus disposed may be employed as a shelf or leaf on which a loaf of bread or cake may be supported while individual slices are being cut therefrom, or during the operation of making sandwiches, and in various other operations of this general character.

Disposed beneath the cabinet are drawers or compartments 11 and 12 each having at the front a knob 13. These drawers are adapted to swing beneath the cabinet to a position in which they are closed by the top wall 5, and are adapted to be swung out respectively beyond the opposite sides of the cabinet. The two drawers when closed or swung beneath the cabinet conjunctively correspond in area thereto, and each drawer is pivotally connected at its outer corner portions with the adjacent portion of the cabinet for swinging movement. As shown in Figs. 1 and 2, the drawer 12, for instance, is pivotally mounted upon the lower end of a bolt 14 which passes upwardly through openings in the bottom 2 and lower shelf 6. The head of this bolt rests upon the upper surface of the shelf 6, while the lower end of the bolt is fitted with a nut 15 to hold the drawer in connection therewith. The bolt passes upwardly through cylindrical washers 16 fitted in the openings in the drawer, bottom and aforesaid shelf of the cabinet and also passes through angular blocks 17, which in conjunction with the washers, form the bearings therefor, two of the angular sides of each block bearing against the adjacent walls of the drawer and cabinet body, whereby the blocks are held from rotation. It will be understood that the drawers 11 and 12 may be used for storing sliced bread, cake, sliced meats and other like articles of food, and serve to support the cabinet.

For convenience in the use of the cabinet, I provide as an adjunct for coöperation with either drawer 11 or 12 a cutter by which a loaf of bread or cake or piece of meat to be sliced may be supported from the top of the cabinet and severed into slices, which drop down into the open drawer, the latter serving as a receptacle for the slices until they are used. As shown, the cutter comprises a bracket bar 18 having at one end a depending arm 19 formed with a stationary supporting and clamping plate 20 to rest upon an extension 5ª of the top wall 5 at either end of the cabinet, said arm 19 being provided with an extension 21 projecting under said plate and carrying a clamping screw 22 adapted to bind against the underside of the extension 5ª to support the bracket bar in position. When applied to either end of the extension 5ª, the bracket bar extends above and parallel therewith and serves as a stop or abutment for the end of the loaf. At the opposite or free end of the bracket bar a bearing sleeve 23 is formed for the reception of the cylindrical central portion of a bolt 24, which is provided with angular portions 24' and 25 and cylindrical threaded ends 26 and 27. A cutting knife 28, of segmental or crescent form, is rigidly mounted at one end upon the angular portion 24', being provided with a correspondingly shaped opening through which said portion 24 passes. A washer 29 is mounted upon the bolt between the bearing 23 and outer side of the knife, while a washer 30 is fitted upon the angular portion 24' and bears upon the opposite side of the knife, said washer being retained in position by a nut 31 upon the threaded end 26, by which said parts are retained in position. A crank handle 32 has its hub or sleeve 33 angularly bored and fitted upon the angular end 25 of the shaft and clamped in position by a nut 36 applied to the threaded end 27, by which the shaft and cutting blade are revolubly mounted upon the bracket, so that by rotating the blade through the operation of the crank handle the end of the loaf resting against the bracket will be sliced. Hence by applying the cutter to either end extension 5ª of the top, a loaf of bread, cake or meats of various kinds may be conveniently sliced so that the slices may drop down into the adjacent open drawer 11 or 12, in which they will be held and stored for use. It will be understood that by using washers 29 of different sizes the position of the blade may be changed to cut thick or thin slices.

From the foregoing description, taken in connection with the drawings, it will be seen that my invention provides a simple, convenient and inexpensive construction of cabinet of this character which is effective for its intended purpose and which, through the provision of the drawers 11 and 12, is adapted for storing an increased quantity of sliced material in such a manner as to be reached without opening the body of the cabinet and exposing the contents thereof. The arrangement of these drawers also adapts them to be employed in connection with a cutter of the character and for the purpose described, thus adding to the convenience of the device.

Having thus fully described the invention, what is claimed as new is:—

1. A bread or like cabinet having a top provided with an extension projecting beyond the cabinet, a drawer pivotally mounted to swing to a closed position beneath the cabinet and to an open position beyond said side, and a cutter mounted upon said extension, whereby a loaf of bread or the like may be supported upon the top and sliced so that the slices will fall into the underlying open drawer.

2. A bread cabinet comprising a body forming a storage compartment and having a top provided with an extension; and also having a drawer or receptacle adapted to be opened to a position below said extension, a bracket adapted to be secured to the extension and having an arm extending parallel with said extension above and outwardly beyond the same, a cutting knife, a shaft supporting the same and mounted upon said arm, means adjustable toward and from the edge of the extension for supporting said shaft, and an operating handle carried by the shaft, whereby the knife may be oscillated to sever a loaf resting upon the top into slices so that the same will drop into the underlying drawer.

In testimony whereof I affix my signature in presence of two witnesses.

PER NELSON.

Witnesses:
  C. BAGNALL,
  BEN JOHNSON.